(12) United States Patent
Wang et al.

(10) Patent No.: US 9,981,310 B2
(45) Date of Patent: May 29, 2018

(54) DEGASSING AND MICROSTRUCTURE REFINEMENT OF SHAPE CASTING ALUMINUM ALLOYS

(71) Applicant: GM Global Technology Operations LLC, Detroit, MI (US)

(72) Inventors: Qigui Wang, Rochester Hills, MI (US); Devin R. Hess, Burton, MI (US); Jason R. Traub, Clinton Township, MI (US); Christopher D. Cogan, Clarkston, MI (US); Andrew J. Genualdi, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 14/841,752

(22) Filed: Sep. 1, 2015

(65) Prior Publication Data

US 2017/0056971 A1 Mar. 2, 2017

(51) Int. Cl.
| | | |
|---|---|---|
| *B22D 27/08* | (2006.01) | |
| *B22D 1/00* | (2006.01) | |
| *B22D 21/04* | (2006.01) | |
| *B22D 35/04* | (2006.01) | |
| *B22D 41/00* | (2006.01) | |
| *B22D 25/02* | (2006.01) | |
| *C22B 21/06* | (2006.01) | |
| *C22B 9/02* | (2006.01) | |

(52) U.S. Cl.
CPC ............. *B22D 27/08* (2013.01); *B22D 1/007* (2013.01); *B22D 21/04* (2013.01); *B22D 25/02* (2013.01); *B22D 35/04* (2013.01); *B22D 41/00* (2013.01); *C22B 9/026* (2013.01); *C22B 21/06* (2013.01); *Y02P 10/234* (2015.11)

(58) Field of Classification Search
CPC ........ B22D 1/007; B22D 27/08; B22D 21/04; B22D 41/00; B22D 25/02; B22D 35/04
See application file for complete search history.

(56) References Cited

U.S. PATENT DOCUMENTS

| | | | | |
|---|---|---|---|---|
| 7,134,479 | B2 * | 11/2006 | Bend .................. | B22C 9/082 164/136 |
| 2007/0235159 | A1 * | 10/2007 | Han ..................... | B22D 1/00 164/66.1 |
| 2016/0228943 | A1 * | 8/2016 | Han ..................... | B22D 11/117 164/478 |

FOREIGN PATENT DOCUMENTS

| | | |
|---|---|---|
| CN | 102632222 A | 8/2012 |
| CN | 204565082 U | 8/2015 |

* cited by examiner

*Primary Examiner* — Kevin P Kerns
*Assistant Examiner* — Steven S Ha

(57) ABSTRACT

A degassing and grain refinement system for a cast aluminum-based component and a method of achieving both hydrogen gas presence reduction and grain size reduction in a cast aluminum-based component. Ultrasonic vibrations are imparted to both the liquid metal travel path from its source to the mold to achieve the reduction in hydrogen gas in the molten metal, as well as to one or more locations within the mold to achieve relatively small and equiaxed grains in the component upon solidification.

6 Claims, 5 Drawing Sheets

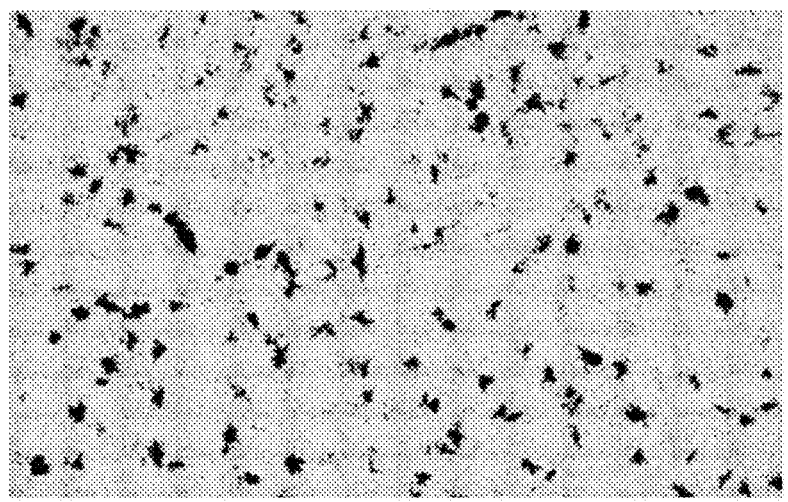
FIG. 3A  5000 μm
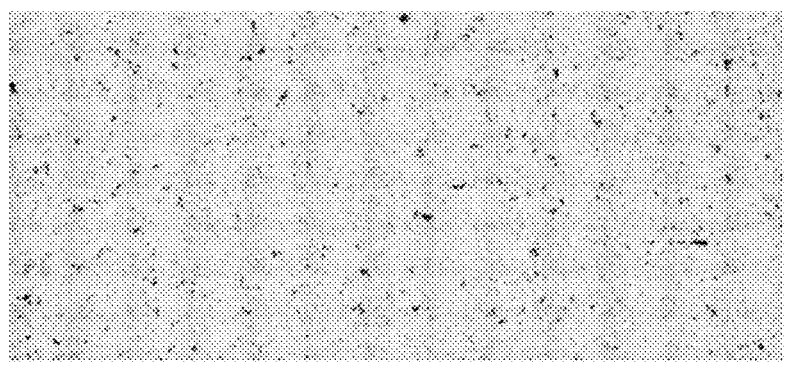
FIG. 3B  5000 μm
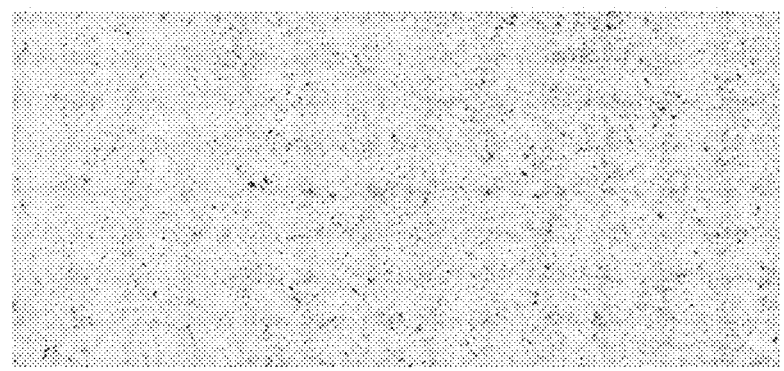
FIG. 3C  5000 μm

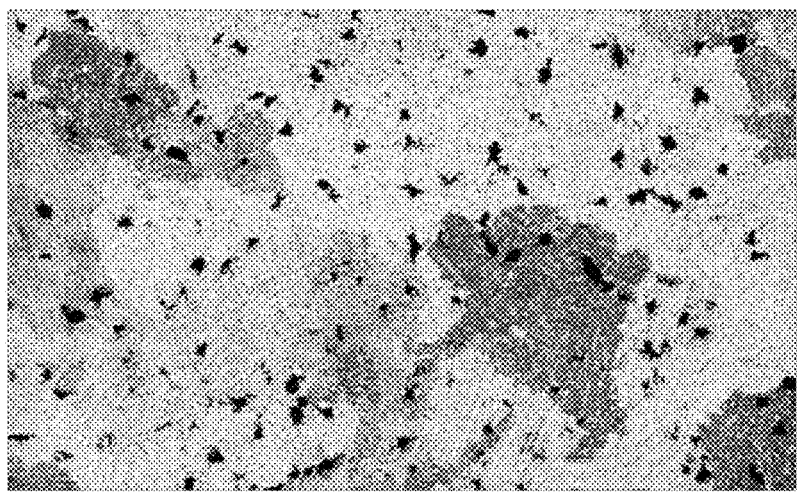
FIG. 6A  5000 μm
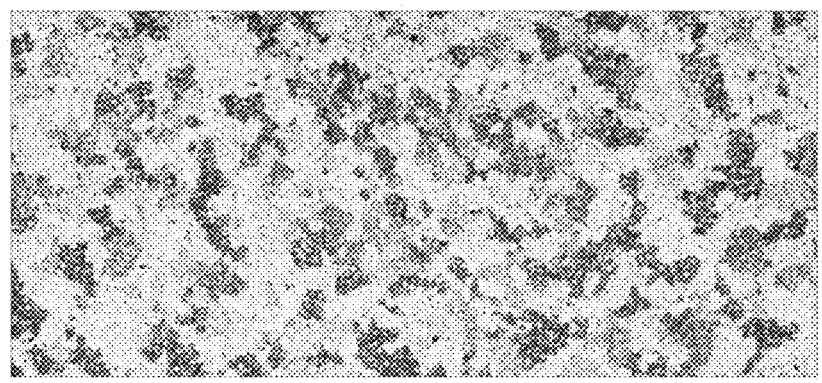
FIG. 6B  5000 μm
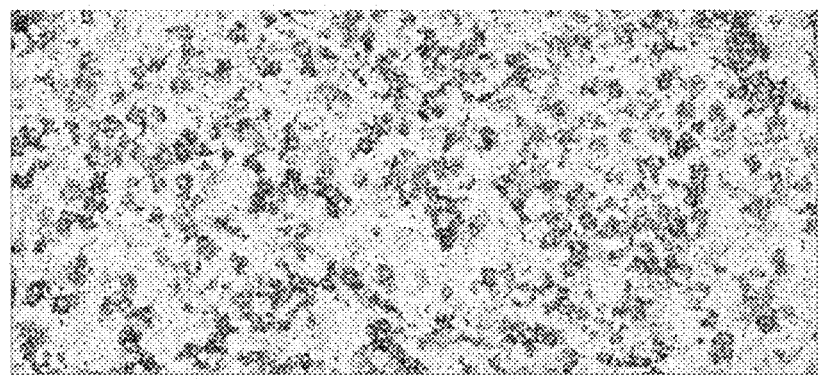
FIG. 6C  5000 μm

DEGASSING AND MICROSTRUCTURE REFINEMENT OF SHAPE CASTING ALUMINUM ALLOYS

FIELD OF THE INVENTION

The present invention relates to the manufacturing of cast aluminum components and, more particularly, to methodologies and technologies to produce porosity-free aluminum castings with fine microstructure without using degassing equipment or grain refiners.

BACKGROUND TO THE INVENTION

Porosity and grain structure have long been recognized as factors affecting mechanical properties, especially fatigue performance, of cast components. Porosity forms due to volume shrinkage from liquid to solid during solidification, while undesirable grain structures (including large and columnar grain formations) can form if solidification temperatures are not carefully controlled. These problems are particularly acute in the casting of lightweight metal alloys (such as aluminum-based alloys in general and the Al—Si alloys (319, 356, 390 or the like in particular) that are used to make—among other things—automotive cylinder blocks and heads.

Regarding porosity, the evolution of dissolved gases as a result of the significant decrease in solubility of the gases in the solid as compared to the liquid metal is often the primary cause. This is especially true for aluminum-based castings, where hydrogen-induced porosity is the dominant form due to hydrogen being the only gas that is appreciably soluble in molten aluminum. As such, there are several methods that are currently employed to reduce inclusion and hydrogen content in liquid aluminum. These methods include various degassing techniques, including rotary impeller degassing, tablet (such as hexachloroethane ($C_2Cl_6$)) degassing, vacuum degassing and spray degassing. Although such degassing methods have demonstrated effectiveness to varying degrees in refining aluminum-based melts, they can cause environmental problems (for example, due to $Cl_2$ gas release) or involve significant capital investment.

Regarding grain structure, it is desirable to pursue fine and equiaxed grain structure in aluminum-based castings as a way to minimize shrinkage, hot tearing and fatigue susceptibility, as well as giving a more uniform distribution of fine scale second phases and microporosity. These in turn improve yield strength, fracture toughness and other useful mechanical properties. Generally, any factor which increases the number of nucleation sites or reduces growth rate has a tendency to yield fine grains in an as-cast aluminum alloy. Commonly-used techniques include using a chill or related insert in the mold to increase local solidification rate (which in turn tends to promote grain size reduction and related mechanical properties). For instance, in a sand-cast engine block, the bulkheads near the crankshaft journal areas are formed with heavy metal chills to assure the required mechanical properties. Unfortunately, when chills are used, undesirable local columnar grain structure may form; such structure can significantly reduce the fatigue performance of the material. Therefore, in practice grain refiners in the form of chemical or elemental additives (such as Ti, B, C or combinations thereof) are often placed in the liquid metal or mold prior to mold fill when a chill is employed. Because the addition of such a grain refiner to a liquid metal melt in the furnace tends to lead to sludge settling over time, such an approach can significantly contribute to furnace and recirculation pump maintenance costs. Likewise, in-mold grain refinement tends to produce more oxides (which can contribute to undesirable bi-film formation) and microstructure segregation in the casting. As such, the present inventors believe that both of these approaches to grain refining should be avoided.

SUMMARY OF THE INVENTION

According to an aspect of the invention, a molten metal degassing and grain refinement system is disclosed. The system includes a conveyance assembly configured to fluidly couple a source of said molten metal to a mold, as well as an apparatus configured to impart ultrasonic vibrations to portions of the conveyance assembly (or to the molten metal that flows through a travel path defined by the conveyance assembly) such that during at least a portion of its travel between the source and the mold, the molten metal interacts with the vibrations to experience a reduction in the hydrogen gas presence as well as (upon subsequent solidification) its grain size. Such a configuration takes advantage of the fact that the solubility of hydrogen, oxides or other impurities (which are a significant contributor to as-cast porosity) is dramatically higher in the liquid or molten state relative to the solid state. In this way, the induced vibrations along the molten metal travel path tend to force the less dense gaseous impurities out prior to the metal being solidified (hardened) in the mold. As such, by the time that a substantial entirety of the metal contained within the ladle has solidified, most (or all) of the hydrogen (or other gaseous impurities) that was previously held within the molten metal has been liberated. Moreover, placement of the vibrations adjacent portions of the mold further help to ensure small, equiaxed grains upon component solidification. In this way, reductions in both hydrogen gas presence and grain size are imparted to the melt. Thus, depending on the location of the vibration-inducing equipment, the degassing and grain refinement can take place continuously or locally. For example, in situations where degassing or grain refinement of the entire cast component is desired, the ultrasonic vibration actuators may be located in numerous places along the casting process travel path, including the launder tube, pouring ladle or pouring basin. Likewise, local degassing or grain refinement at select component locations (such as the bulkheads in an engine block or combustion chambers in a cylinder head) may be achieved by placing the ultrasonic vibration actuation equipment adjacent particular portions of the mold that correspond to various component regions. In one exemplary form, they may be located on the chill or related heat sink insert that is placed adjacent an engine block bulkhead, cylinder head combustion chamber or the like. Significantly, the operation of the vibration-inducing equipment allows such degassing and grain refinement to take place without complex additional machinery or the use of grain refiner additives to the molten metal.

According to another aspect of the invention, a method of producing a cast aluminum component is disclosed where both degassing and structural refinement is performed using ultrasonic vibrations. The method includes conveying an aluminum-based melt (also referred to as a molten metal or liquid metal precursor to the finished component) from its source to a mold, applying ultrasonic vibrations to the melt during at least a portion of its travel path between the source and mold as a way to achieve hydrogen degassing in the melt relative to no such vibrations being present, and applying ultrasonic vibrations to the melt during its solidification in the mold such that at least a portion of the component exhibits reductions in grain size relative to no such vibrations being present.

BRIEF DESCRIPTION OF THE DRAWINGS

The following detailed description of specific embodiments can be best understood when read in conjunction with the following drawings, where like structure is indicated with like reference numerals and in which:

FIGS. 3A through 3C are photomicrographs showing a comparison of porosity for an aluminum alloy casting sample, where FIG. 3A specifically shows such porosity without the use of ultrasonic vibrations and FIGS. 3B and 3C show such porosity reduction with successively longer ultrasonic vibration application times;

FIGS. 6A through 6C are photomicrographs showing a comparison of grain sizes for an aluminum alloy casting sample, where FIG. 6A specifically shows such sizes without the use of ultrasonic vibrations and FIGS. 6B and 6C show such size reduction with successively longer ultrasonic vibration application times.

DETAILED DESCRIPTION OF THE INVENTION

Figure 1:
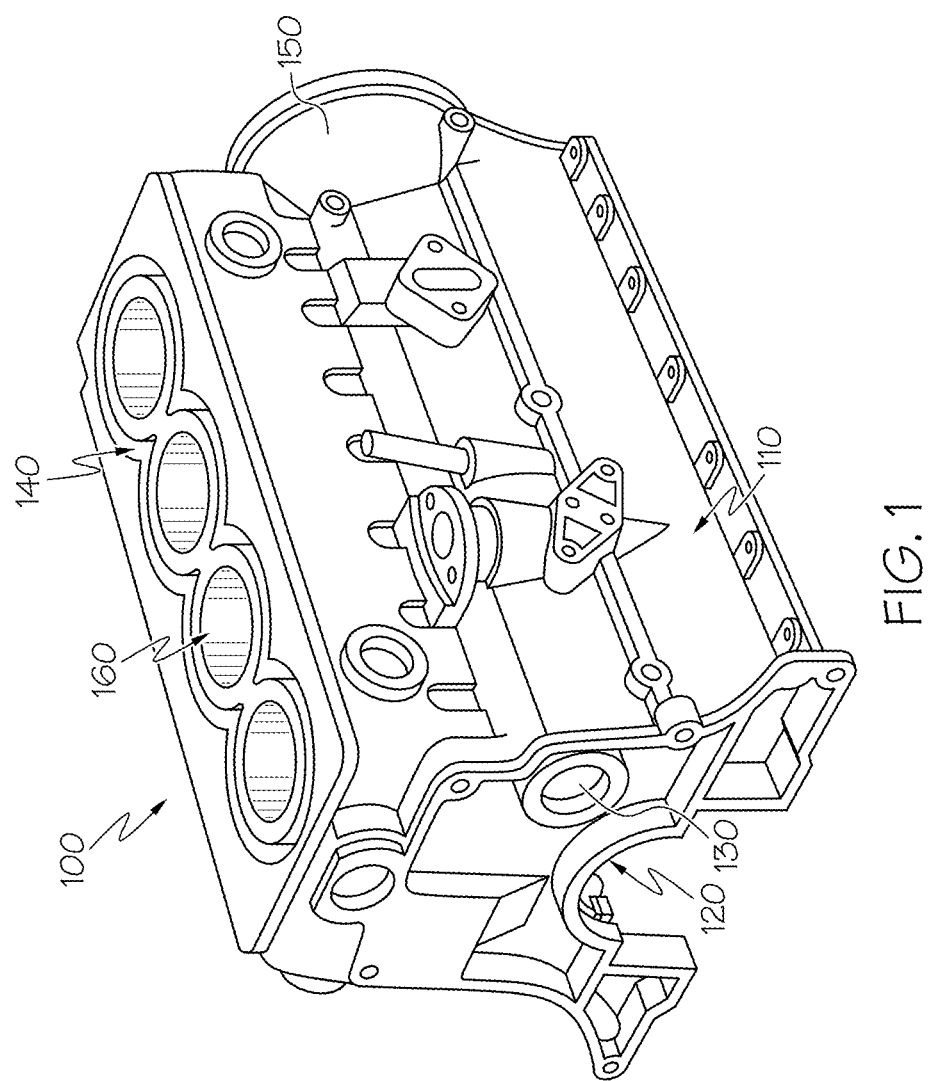
FIG. 1 depicts a view of a notional engine block that could be cast according to an aspect of the present invention.

Referring first to FIG. 1, a simplified view of a four-cylinder automotive internal combustion engine block 100 with cylinder bores (also referred to herein as "engine bores" or more simply, "bores") 105 is shown. In addition to the bores, and depending on the engine configuration, the block 100 includes portions for—among other things—a crankcase 110, crankshaft bearing 120, camshaft bearing 130 (in the case of engines with overhead valves and pushrods), water cooling jackets 140, flywheel housing 150 and cylinder bores 160 may be defined by the cavity. Although not shown, a cylinder head is secured (such as by bolting) to the top of the engine block 100 and defines (among other things) generally cylindrical-shaped dome-like regions that align with the cylinder bores 105 discussed above so that combustion chambers that are populated with pistons, spark plugs and valves (none of which are shown) may affect the combustion process and consequent propulsive power. As will be discussed in more detail below, the present invention may be used to provide localized enhancement of material structural properties for the bearings 120, 130 and other surfaces that are expected to bear significant static or dynamic loads.

Figure 2A:
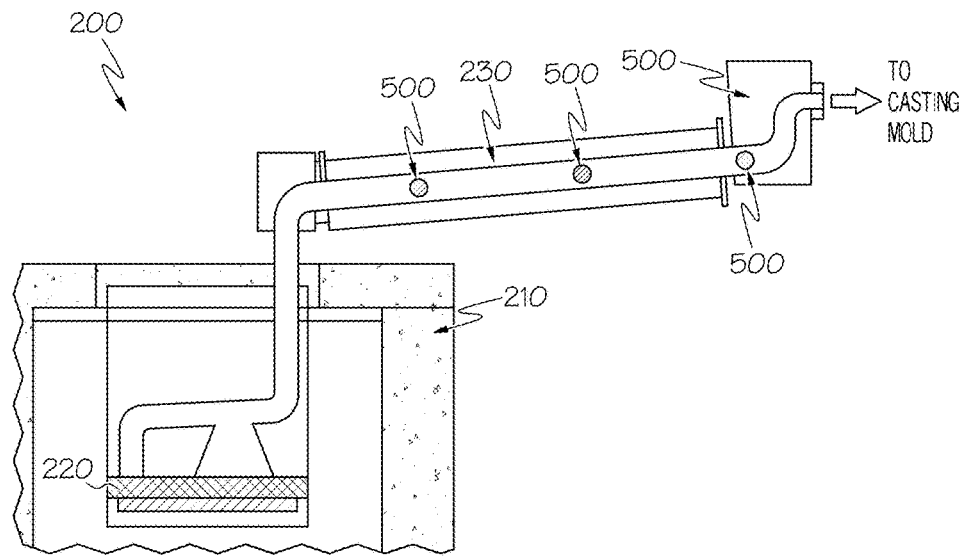
FIGS. 2A and 2B show the fluid connectivity between a simplified molten metal conveyance assembly and casting assembly according to an aspect of the present invention.
Figure 2B:
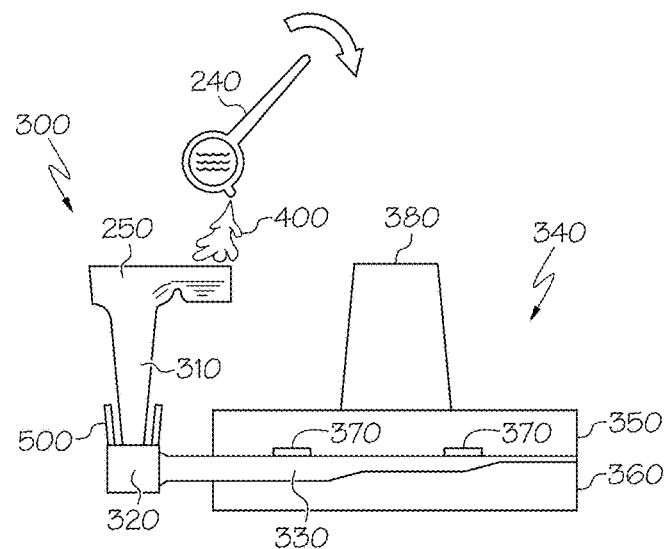

Referring next to FIGS. 2A and 2B, the fluid cooperation between the upstream molten metal conveyance assembly 200 and downstream casting assembly with gravity pouring 300 is shown. The aluminum-based material is first melted in a furnace 210 and then forced through the molten metal conveyance assembly 200 by a pump (such as an electromagnetic pump, mechanical pump or other pump as known in the art) 220. The molten metal conveyance assembly 200 includes various fluid channels, including launder tube 230, ladle 240 and pour basin 250 (shown notionally as an offset basin, but equally applicable to conical or other shapes). The casting assembly 300 includes a sprue 310 that accepts the molten metal (or melt) 400 from the ladle 240 and pour basin 250. From the sprue 310, the molten metal 400 collects in a fill cap or well 320 and then into a generally horizontal runner 330 (for low pressure casting operations such as sand casting) or a shot sleeve (not shown, for high pressure die casting operations). The mold 340 may include a cope 350 and drag 360 as corresponding upper and lower halves of a separable structure, although other variants (such as those used to make an engine block or cylinder head as known in the art) may also be used for mold 340. Generally horizontal ingates 370 are used to fluidly couple the runner 330 to one or both of the cope 350 and drag in order to deliver the molten metal 400 to the internal cavity that defines the shape of the component being fabricated. An additional riser 380 (also called a feeder) may be placed in the uppermost portion of the mold 340 to be used for optional additional feed to compensate for solidification shrinkage.

The ultrasonic vibration imparting apparatus 500 includes numerous discretely-placed vibration exciters or actuators such as probes, transducers, or the like. In an alternate embodiment, the vibrations from the ultrasonic vibration imparting apparatus 500 may be imparted by a magneto-hydrodynamic stifling mechanism such as a magnet-based electromagnetic coil or the like. Furthermore, in situations where the ultrasonic probes, transducers or coils are placed in locations where they would be exposed to very high temperature environments such as the casting mold, they may further include cooling mechanisms (such as by forced water cooling). In one form as shown with particularity in FIG. 2A, the actuators of the ultrasonic vibration imparting apparatus 500 are spaced along the axial length of the launder tube 230, although additional placement adjacent one or both of the ladle 240 and pour basin 250 or in the sprue 310 (as shown with particularity in FIG. 2B) or runner 330 are also preferable, as is around any other region between the launder tube 230 and the mold 340 (as notionally shown in FIG. 2B) where molten metal 400 degassing may be required. By applying ultrasonic vibrations of a certain minimum intensity (for example, with an acoustic intensity of 10 W/cm$^2$ at 60% amplitude and a frequency of 20 kHz) to the molten metal 400 that is traversing the launder tube 230, ladle 240, pour basin 250 and sprue 310, the residual hydrogen that is present in the molten metal 400 may—through concomitant agitation—bubbles up to the surface in a continuous degassing motion over the travel path length that is defined by the portion of the molten metal conveyance assembly 200 that is in vibratory cooperation with the ultrasonic vibration imparting apparatus 500.

Referring next to FIGS. 3A through 3C, the results of a degassing operation on an aluminum-based alloy sample is shown. In particular, FIG. 3A shows significant dark areas (porosity) that are present when the metal in molten form is not subjected to any form of ultrasonic vibrations, while FIGS. 3B and 3C show successively smaller amounts of porosity when the molten metal is subjected to ultrasonic vibrations for 15 seconds at 750° C. temperature (FIG. 3B) and 34 seconds at 750° C. temperature (FIG. 3C).

Figure 4:
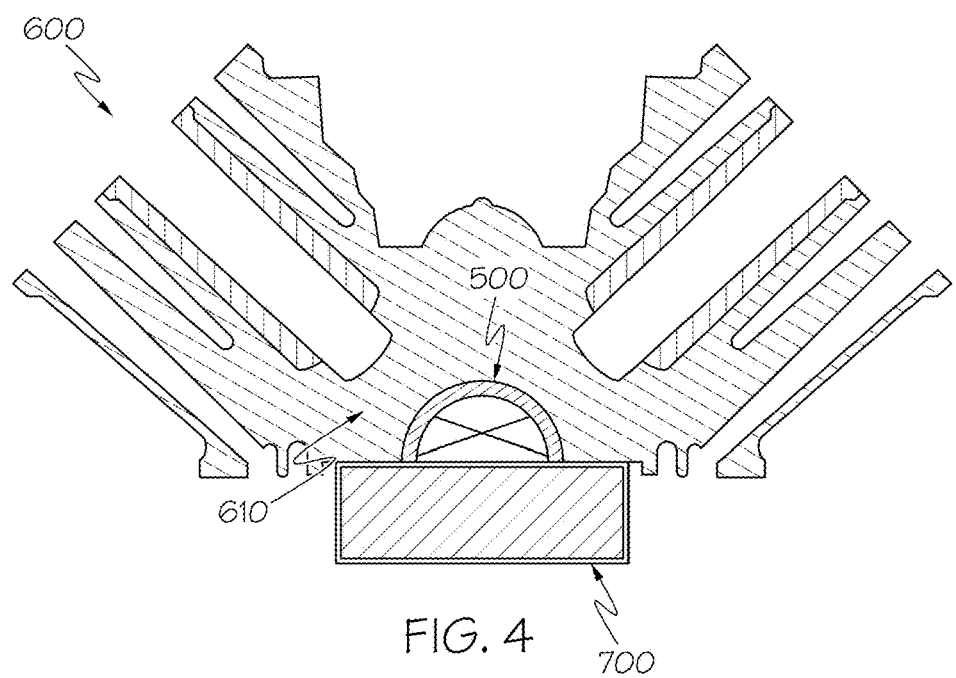
FIG. 4 shows a notional placement of the ultrasonic vibration-imparting apparatus relative to a the bulkhead of a V-shaped engine block.
Figure 5:
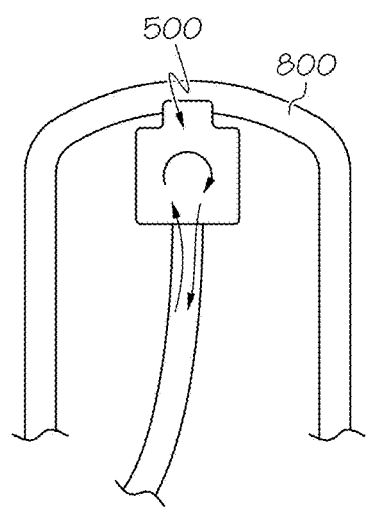
FIG. 5 shows a notional placement of the ultrasonic vibration-imparting apparatus relative to a combustion chamber of a cylinder head.

Referring next to FIGS. 4 and 5, two notional placements of the ultrasonic vibration imparting apparatus 500 by an engine block (FIG. 4) and a cylinder head (FIG. 5) are shown. With particular regard to FIG. 4, portions of a V-shaped block 600 are shown. Other than having a pair of generally angled banks with which to define cylinder bores (and possibly a greater number of such bores), block 600 is of similar construction to block 100 discussed above, and includes a bulkhead area 610 that may correspond to the longitudinal front or back of the block 600 to house bearings similar to bearings 120, 130 of block 100. The ultrasonic vibration imparting apparatus 500 (shown presently in the form of an electromagnetic coil) may be placed adjacent the portion that is in need of additional surface hardening through grain refinement (such as the bearings 120, 130 mentioned above). As discussed above, the present inventors have discovered that applying ultrasonic vibrations in conjunction with a localized chill 700 significantly reduces grain size, as well as the tendency to grow in a columnar fashion. As shown with particularity in FIG. 5, the ultrasonic vibration imparting apparatus 500 may also be placed within the dome region of the cylinder head 800. Cooling used to affect rapid solidification (and the preferred equiaxial grain structure) may be achieved by routing chilled water or a related coolant to and from the probe or transducer (as shown by the arrows).

Referring next to FIGS. 6A through 6C, the results of a grain refinement operation on an aluminum-based alloy sample is shown. In particular, FIG. 6A shows significant porosity and a relatively large grain structure when the metal is solidified without being subjected to any form of ultrasonic vibrations, while FIGS. 6B and 6C show successively smaller (i.e., finer) grain sizes when the molten metal is subjected to ultrasonic vibrations for 15 seconds at 750° C. temperature (FIG. 6B) and 34 seconds at 750° C. temperature (FIG. 6C) just prior to solidification. Significantly, both the porosity reductions of FIGS. 3B and 3C, as well as the grain size reduction and omnidirectional patterns of FIGS. 6B and 6C are achieved without recourse to additives such as grain-refining agents or degassing additives. Moreover, such results are achieved without the need for complex degassing equipment.

In the present context, each of the parts that make up the conveyance assembly 200 are shown as separate, discrete components. Nevertheless, it will be appreciated by those skilled in the art that the various functional attributes of these components (including, the launder tube 230, ladle 240 and pour basin 250) may be subsumed into larger, more structurally-integrated components as a way to mimic the various liquid metal-conveying functions described herein, and that any combination of such integrated components that perform such function or functions is deemed to be within the scope of the present invention, irrespective of whether the components performing such function are physically separable from one another. For example, the distal end of the launder tube 230 may be outfitted with an integrally-formed nozzle or related dispenser (not shown) that acts as the ladle 240 such that the molten metal 400 that traverses the launder tube 230 is dispensed from the ladle 240 and into the pour basin 250. The fact that the ladle 240 is either (a) integrated in a structural sense with the launder tube 230 or (b) not even present does not detract from the fact that its functional attributes are still present if the molten metal 400 is delivered from the furnace 210 and through the launder tube 230 to the suitable pour basin 250. As such, the presence of these functional attributes, rather than their respective structural component in discrete form, is what determines whether they form a part in the overall conveyance assembly 200, and that as long as such function is in evidence, the corresponding structure is deemed to likewise be present.

The placement of the vibration-inducing apparatus 500 in general (with the aforementioned probe or transducer portion of the apparatus in particular) is recited and described as being "at" one or more discrete locations along the molten metal 400 travel path, as well as "in" or "at" one more locations within the mold 340 that is used to give the component its shape. Within the present context, this does not mean that such apparatus must physically be embedded into the corresponding conveying assembly 200 or mold 340 (although they can be), but merely means that such apparatus is placed close enough to ensure the efficacy of the generated ultrasonic vibrations relative to the molten or solidifying metal; as such, placement of the vibration probe, transducer or coil of the vibration-inducing apparatus 500 may be on or adjacent an inner or outer surface of the assembly 200 or mold 340.

By using a suitable controller (not shown), the casting operation may be automated. In such case; the controller may be equipped with a central processing unit (CPU), and content-addressable memory (for example, in the form of read-only memory (ROM) for storing a program which controls the operation of the overall apparatus, and a random-access memory (RAM) having a data storage area). The CPU is connected to an input/output interface (which may perform one or both of discrete and analog input and output), while additional signal-processing apparatus, such as an analog-to-digital (A/D) converter and one or more filter circuits. Such a controller may function as a digital signal processor, an application specific integrated circuit, a field programmable gate array, any suitable programmable logic device, discrete gate or transistor logic, discrete hardware components, or any combination thereof. In one preferred form, the controller is configured to instruct the ultrasonic vibration imparting apparatus 500 how to stage its operation, including frequencies and vibration amplitude. In one exemplary form, such vibration is performed with a minimum acoustic intensity of 10 W/cm$^2$, 60% amplitude (i.e., a measure of the energy range of the vibrations) at a vibration frequency of at least about 15 kHz, and more preferably at least about 20 kHz. The present inventors have determined that to be able to perform adequate degassing and grain refinement of cast aluminum alloys, the frequency needs to be at least 15 kHz, and that while higher frequency is helpful, practical limits on ultrasonic vibration equipment capital costs need to be taken into consideration. In the present context, an upper limit frequency of about 100 kHz should suffice for a balance of high frequency capability coupled with reasonable equipment costs. Likewise, the desired amplitude range is between about 50% and 100%.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A degassing and grain refinement system for a cast aluminum-based component, said system comprising:
   a molten metal conveyance assembly configured to fluidly couple a source of said molten metal to a mold with a shape therein that substantially defines said component, said molten metal conveyance assembly having a launder tube, a ladle, and a pour basin and said mold having a sprue and runner; and
   an apparatus cooperative with said conveyance assembly to impart ultrasonic vibrations thereto such that during at least a portion of its travel path between said source and said mold, said molten metal experiences reductions in hydrogen gas presence therein relative to no such vibrations being present, and further such that during a subsequent solidification of said molten metal in said mold, at least a portion of said component exhibits reductions in grain size relative to no such vibrations being present.

2. The system of claim 1, wherein said ultrasonic vibration imparting apparatus is situated at discrete locations along at least the portion of said travel path that is defined by said launder tube.

3. The system of claim 2, wherein said ultrasonic vibration imparting apparatus is further situated at discrete locations along at least a portion of said travel path that is defined by said ladle, pour basin, sprue and runner.

4. The system of claim 2, wherein said ultrasonic vibration imparting apparatus is further situated in at least one location within said mold.

5. The system of claim 1, wherein said system prohibits an introduction of any grain-refining agents to said liquid metal.

6. A degassing and grain refinement system for a cast aluminum-based component, said system comprising:
   a molten metal conveyance assembly configured to fluidly couple a source of said molten metal to a mold with a shape therein that substantially defines said component, said molten metal conveyance assembly having a launder tube, a ladle, and a pour basin and said mold having a sprue and runner; and
   a plurality of vibration imparting apparatuses to impart ultrasonic vibrations thereto such that during at least a portion of its travel path between said source and said mold, said molten metal experiences reductions in hydrogen gas presence therein relative to no such vibrations being present, and further such that during a subsequent solidification of said molten metal in said mold, at least a portion of said component exhibits reductions in grain size relative to no such vibrations being present, wherein said plurality of vibration imparting apparatuses are situated at discrete locations along at least the portion of said travel path that is defined by said launder tube, situated at discrete locations along at least a portion of said travel path that is defined by said ladle, pour basin, sprue and runner, and situated in at least one location within said mold.

* * * * *